March 25, 1969 A. BARTH ET AL 3,434,601
FILTER FOR FLUIDS
Filed Sept. 27, 1966
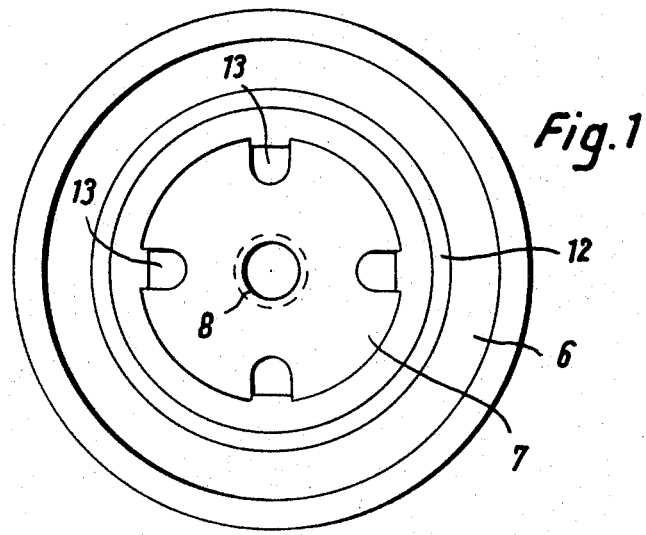
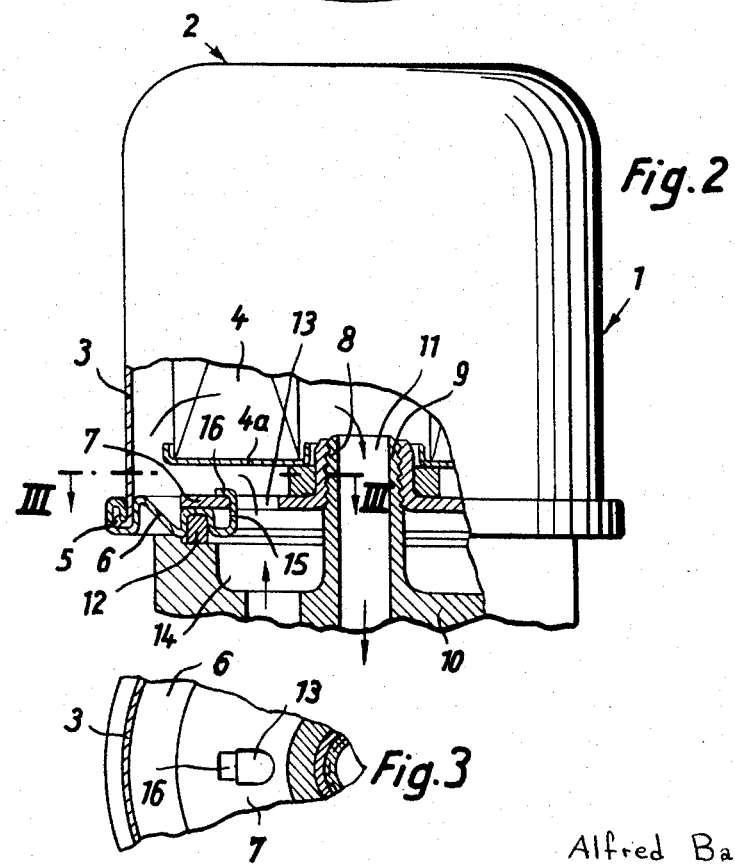
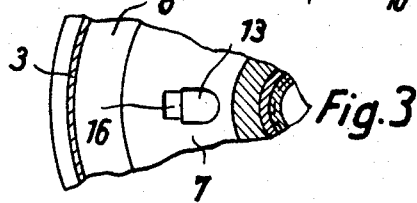
INVENTORS
Alfred Barth
Karl Beck
Walter Wiedmann
BY Sparrow and Sparrow
ATTORNEYS

United States Patent Office 3,434,601
Patented Mar. 25, 1969

3,434,601
FILTER FOR FLUIDS
Alfred Barth and Karl Beck, Ludwigsburg, Wurttemberg, and Walter Wiedmann, Neckarweihingen, Wurttemberg, Germany, assignors to Messrs. Filterwerk Mann & Hummel G.m.b.H., Ludwigsburg, Wurttemberg, Germany
Filed Sept. 27, 1966, Ser. No. 582,272
Claims priority, application Germany, Sept. 28, 1965,
F 47,290
Int. Cl. B01d 27/08, 35/00
U.S. Cl. 210—440                                   2 Claims The invention relates to a disposable filter for a fluid, such as internal combustion engine lubricating oil.

A previously prepared disposable filter comprises a cup-shaped housing of thin sheet metal containing a filter element the rim of the housing being connected in a fluid-tight manner to cover by means of a folded seam. The cover has a central, screw-threaded bore for screwing it on to a screw-threaded filtrate outlet connecting piece of a connection member. An annular inflow cavity for the dirty fluid flowing to the inlet apertures in the cover is defined between the cover and the connection member and is sealed by a sealing ring compressed between the cover and the connection member.

Such disposable filters are highly advantageous in that, during manufacture, the relatively delicate filter element can be inserted into the filter housing in a satisfactorily sealed manner by skilled labour using appropriate tools and under constant supervision. Thus, damage to the filter element is prevented during carriage or during handling by unskilled labour, and incorrect, nonfluid assembly is also prevented. Servicing is particularly simple, since only the complete filter has to be interchanged, no expert knowledge being required.

On the other hand, disposable filters, in addition to functioning well, must be sufficiently cheap for their use to be economic in comparison to filters having an interchangeable filter element. For this reason, efforts are made to use housing parts whose walls are as thin as possible.

The housing cover of the disposable filter is subjected to considerable stresses as a consequence of the manner in which the filter is secured, and by the pressures occurring during operation. These stresses cannot be absorbed by a thin-wall cover alone, unless it is strengthened by special shaping, e.g., a conical shape, which would require an increase in the size of the filter housing. A sufficiently thick-walled cover would render more difficult its fluid-tight connection to the rim of the housing made of thin sheet metal. For this reason, a thin-walled cover ring has in the past been connected to the cup-shaped housing by a folded seam and a thick-walled cover plate absorbing the main load of the bending stress has been provided at the inside of the cover ring and rigidly connected thereto.

In one previous proposal, the cover plate is welded to the cover ring. However, it is difficult to automate welding operations of this kind, and they require a large installation and suitable operators. Also, the supervision of the quality of the welded joint is so difficult that spot checks have to suffice, and a corresponding factor of uncertainty has to be taken in account.

In another previous proposal, the cover plate has an angled flange which is stressed radially against the housing wall when the latter is seamed to the cover ring. In this case, the required rigid connection of the cover plate to the cover ring or the housing is not ensured. Therefore, spot welds must be invariably provided between the cover plate and the cover ring.

According to the present invention a disposable filter for fluids comprises a filter element within a cup-shaped housing of thin sheet metal, the rim of the housing being seamed in a fluid-tight manner to a thin-walled cover ring, relatively thick-walled cover plate being rigidly connected to the cover ring on its inside by tongues provided on the inner rim of the cover ring, which tongues engage through inlet apertures of the cover plate and are bent back on its inside, the cover plate having a central, screw-threaded bore for screwing it onto a screw-threaded filter outlet connecting piece of a connection member with a sealing ring clamped between the cover ring and the connection member so that an annular inflow cavity, sealed by the sealing ring, is defined between the cover plate and the connection member for the inflow of dirty fluid to the inlet apertures in the cover plate.

The tongues rigidly connect the cover plate to the cover ring so that welding between the parts may now be omitted. Further, the cover plate is well secured in the axial direction. Thus, the axial pressure on the cover plate, when the disposable filter is being screwed on to the connecting piece of the connection member, is absorbed. That is, the cover plate must not change its position in the axial direction relative to the other parts of the filter, since the relatively delicate filter element might otherwise be damaged.

Surprisingly, the tongue connection between the cover ring and the cover plate, has also proved itself to be particularly resistant to vibration. Disposable filters are subjected to considerable vibration during practical operation, particularly when they are secured directly to an internal combustion engine. A considerable frictional damping occurs between the cover plate and the cover ring interconnected by the tongues. Consequently, the vibrations produced by movements transverse to the axis of the disposable filter have considerably smaller amplitudes of vibration than is the case in the previously mentioned welded connection. The stress on the cover plate and the cover ring is correspondingly reduced.

Compared with the previously mentioned angled flange on the cover plate, there is also the great advantage in that the cover plate does not have to extend to the housing wall. There is thus a saving in material, which is of great importance in mass production to which the invention is advantageously applicable. Further, the quality of the connection between the cover plate and the cover ring may be checked by simple visual means.

The invention is further described by way of example with reference to the accompanying drawings in which:

FIG. 1 is a plan view of the cover end of a disposable filter constructed in accordance with the invention, FIG. 2 is an elevation, partly sectioned, of the disposable filter screwed onto a connection member and FIG. 3 is a section taken on the line III—III in FIG. 2.

Referring to the drawings, a cup-shaped housing 1 is drawn in one piece from thin sheet metal and has a base 2 and a wall 3. The rim 5 of the filter housing is connected in a fluid-tight manner to a thin-walled cover ring 6 by a folded seam. A relatively thick-walled cover plate 7 engages behind the cover ring, which cover plate 7 has a central, screw-threaded bore 8 for screwing onto an externally screw-threaded connecting piece 9 of a connection member 10. The connecting piece 9 has a bore 11 through which the filtrate flows from the cavity of an annular filter element 4 supported on the cover plate 7 in a fluid-tight manner by the inner rim of its annular end plate 4a. A sealing ring 12 is clamped axially between the connection member 10 and the cover ring 6. The annular portion of the cover plate 7 surrounded by the sealing ring has inlet apertures 13 communicating between the housing cavity enclosing the filter element 4, and an annular, dirty fluid inlet space 14 recessed in the connection member 10 around the filtrate outlet connecting piece 9.

Tongues 15 engaging through the inlet apertures in the cover plate 7 are provided on the inner rim of the cover ring 6. The ends 16 of the tongues are bent back over the cover plate 7. The cover plate 7 is thereby rigidly connected to the cover ring 6 and thus also to the filter housing 1.

When the disposable filter is screwed into its operating position illustrated in FIG. 2, the torque is transmitted from the housing shell 3 to the cover ring 6, via the seam on the housing rim 5 and, through the tongues 15 of the cover ring 6, to the cover plate 7. The axial forces are absorbed by the bent over ends 16 of the tongues.

The fluid to be cleaned flows, in the direction of the arrows, through the annular cavity 14 in the connection member 10, and the inlet apertures 13 in the cover plate 7, into the filter housing 1. It then flows radially through the filter element 4 from the outside towards the inside. The filtrate leaves the filter through the bore 11 of the screw-threaded connecting piece 9, and returns in the direction of the fluid consuming device or installation.

We claim:
1. A disposable filter for fluids comprising:
   (a) a relatively thin-walled cup-shaped sheet metal housing having an annular rim,
   (b) a relatively thin cover ring having outer and inner borders,
   (c) a folded seam connecting said outer border of said cover ring to said rim of said housing in a fluid-tight manner,
   (d) a relatively thick cover plate having a central screw-threaded outflow bore and a plurality of inflow apertures arranged about said outflow bore, said cover plate being disposed against the inside surface of said cover ring,
   (e) tongues on said inner border of said cover ring, said tongues extending through said inflow apertures in said cover plate and being bent back against the inside surface of said cover plate to rigidly secure said cover plate to said cover ring, and
   (f) a filter element inside said housing and dividing the interior thereof into an inlet chamber communicating with said inflow apertures and an outlet chamber communicating with said outflow bore.

2. A filter according to claim 1 in which said filter element has an annular end plate and which further comprises a sealing ring between said annular end plate and said cover plate to seal said inlet and outlet chambers from one another.

References Cited
UNITED STATES PATENTS

| | | | |
|---|---|---|---|
| 3,132,097 | 5/1964 | Tietz | 210—130 |
| 3,333,703 | 8/1967 | Scavuzzo et al. | 210—232 |

REUBEN FRIEDMAN, *Primary Examiner.*

T. A. GRANGER, *Assistant Examiner.*